United States Patent
Kelly

(10) Patent No.: US 7,051,472 B1
(45) Date of Patent: May 30, 2006

(54) MULTI-SENSOR ANIMAL TRAP HAVING A PLURALITY OF CONNECTABLE TRAP MEMBERS

(76) Inventor: James L Kelly, P.O. Box 6891, Atlanta, GA (US) 30315

( * ) Notice: Subject to any disclaimer, the term of this patent is extended or adjusted under 35 U.S.C. 154(b) by 0 days.

(21) Appl. No.: 10/919,187

(22) Filed: Aug. 16, 2004

(51) Int. Cl.
*A01M 23/16* (2006.01)

(52) U.S. Cl. .................................. 43/61; 43/58; 43/60

(58) Field of Classification Search ............... 43/58, 43/60, 61, 98
See application file for complete search history.

(56) References Cited

U.S. PATENT DOCUMENTS

| | | | | |
|---|---|---|---|---|
| 3,585,750 | A | * | 6/1971 | Routt ............................... 43/61 |
| 4,138,796 | A | * | 2/1979 | Souza .............................. 43/61 |
| 4,179,835 | A | * | 12/1979 | Hunter ............................ 43/61 |
| 4,741,121 | A | * | 5/1988 | Pratscher et al. ............... 43/58 |
| 4,835,900 | A | * | 6/1989 | Shifflett ........................... 43/58 |
| 4,890,415 | A | * | 1/1990 | Fressola et al. ................. 43/61 |
| 5,027,547 | A | * | 7/1991 | Livshin ......................... 43/124 |
| 5,107,619 | A | * | 4/1992 | Zapata et al. ................... 43/81 |
| 5,148,625 | A | * | 9/1992 | Saleman ........................ 43/121 |
| 5,185,953 | A | * | 2/1993 | Gross ............................. 43/58 |
| 5,918,409 | A | * | 7/1999 | Carnwath ....................... 43/99 |
| 5,953,853 | A | * | 9/1999 | Kim ................................ 43/98 |
| 6,016,623 | A | * | 1/2000 | Celestine ........................ 43/61 |
| 6,029,393 | A | * | 2/2000 | Stewart .......................... 43/63 |
| 6,164,010 | A | * | 12/2000 | Snell et al. ................... 43/131 |
| 6,202,340 | B1 | * | 3/2001 | Nieves ........................... 43/61 |
| 6,684,560 | B1 | * | 2/2004 | Lafforthun ..................... 43/61 |
| 6,775,947 | B1 | * | 8/2004 | Anderson et al. .............. 43/98 |
| 2005/0235553 | A1 | * | 10/2005 | Rail ................................ 43/58 |

* cited by examiner

*Primary Examiner*—Kurt Rowan
(74) *Attorney, Agent, or Firm*—Michael I. Kroll

(57) ABSTRACT

An apparatus for an animal trap having at least one primary trap 32 comprising a rigid grated or screened 34 housing with a front 36 and rear 38 sliding door on each end, a sensor assembly having at least one power source 40, e.g., battery pack, a heating element 42 communicating with a heated bait hanger 44 to heat the bait. A pressure-sensitive sensor pad 46 disposed beneath the hanging bait 44 activates the door closure mechanism. A laser sensor 48 is further included to detect flying prey and others that may circumvent the ground placed pressure sensor 46. A release trap 58 is provided for use as the last trap member when a plurality of trap members is used in conjunction with one another. The release trap 58 has a clear housing fabricated of Plexiglas, tempered glass or other such suitable material. The release trap 58 has an open end to connect with the trap member and a closed end with a sensor assembly 60 to close the sliding door at the open end when prey 64 is detected by the sensors. Once the prey 64 has been contained within the release trap 58, it is removed from the trap member and transported to a location where the prey may be released. The apparatus may be adapted to accommodate the capture of a multitude of various types of animals including, but not limited to, rodents 12, snakes 14, reptiles 16, insects 18, mollusks 20, fish 22, squirrels 24, mammals 26, invertebrates 28 and vertebrates 30.

15 Claims, 11 Drawing Sheets

STEP 3

STEP 2

STEP 3

STEP 4

STEP 5

MULTI-SENSOR ANIMAL TRAP HAVING A PLURALITY OF CONNECTABLE TRAP MEMBERS

BACKGROUND OF THE INVENTION

1. Field of the Invention

The present invention relates generally to animal traps and, more specifically, to an animal trap having a plurality of sensor mechanisms that respond to the presence of an animal therein by closing the sliding door and humanely containing the animal until it is removed to an appropriate location and released. A plurality of traps may be interconnected end-to-end with the adjacent doors open to form an extended containment chamber.

The present invention includes at least one primary trap comprising a rigid grated or screened housing with a sliding door on each end, a sensor assembly having at least one power source, a heating element communicating with a heated bait hanger to heat the bait. The present invention uses redundant sensors to assure capture of the animal within. A pressure-sensitive sensor pad disposed beneath the hanging bait activates the door closure mechanism. A laser sensor is further included to detect flying prey and others that may circumvent the ground placed pressure sensor. Each trap member is provided with a redundant sensor assembly and to operate its doors.

A release trap is provided for use as the last trap member when a plurality of trap members is used in conjunction with one another. The release trap has a clear housing fabricated of Plexiglas, tempered glass or other such suitable material. The release trap has an open end to connect with the trap member and a closed end with a sensor assembly to close the sliding door at the open end when prey is detected by the sensors. Once the prey has been contained within the release chamber, it is removed from the trap member and transported to a location where the prey may be released.

The present invention may be adapted to accommodate the capture a multitude of various types of animals including, but not limited to, rodents, snakes, reptiles, insects, mollusks, fish, squirrels, mammals, invertebrates and many, many more. Variations of the present invention may be employed such as shape, size, material, placement of sensors, door-closing mechanisms and other such modifications without deviating from the concept of the present invention.

2. Description of the Prior Art

There are other traps designed for the humane capture of animals. While these animal traps may be suitable for the purposes for which they were designed, they would not be as suitable for the purposes of the present invention, as hereinafter described.

SUMMARY OF THE PRESENT INVENTION

The present invention includes at least one primary trap comprising a rigid grated or screened housing with a front and rear sliding door on each end, a sensor assembly having at least one power source, e.g., battery pack, a heating element communicating with a heated bait hanger to heat the bait. The present invention uses redundant sensors to assure capture of the animal within. A pressure-sensitive sensor pad disposed beneath the hanging bait 44 activates the door closure mechanism. A laser sensor is further included to detect flying prey and others that may circumvent the ground placed pressure sensor. A release trap is provided for use as the last trap member when a plurality of trap members is used in conjunction with one another. The release trap has a clear housing fabricated of Plexiglas, tempered glass or other such suitable material. The release trap has an open end to connect with the trap member and a closed end with a sensor assembly to close the sliding door at the open end when prey is detected by the sensors. Once the prey has been contained within the release chamber, it is removed from the trap member and transported to a location where the prey may be released. The present invention may be adapted to accommodate the capture of a multitude of various types of animals including, but not limited to, rodents, snakes, reptiles, insects, mollusks, fish, squirrels, mammals, invertebrates and vertebrates.

A primary object of the present invention is to provide a multi-sensor animal trap having a plurality of sensors that will detect when prey has entered the trap and will activate a door-closing mechanism to contain the animal therein.

Another object of the present invention is to provide a multi-sensor animal trap having a plurality of interlocking trap components that may be connected to one another in end-to end fashion to form an extended containment chamber therein wherein any number of trap members may be used attached together or one by itself.

Yet another object of the present invention is to provide a multi-sensor animal trap wherein each trap member includes an entry door and a an exit door with a sensor assembly disposed on a top portion proximal to said exit door with a heatable, bait hanger extending downward therefrom. Still yet another object of the present invention is to provide a multi-sensor animal trap having a pressure sensitive sensor disposed on the bottom of the containment chamber below said bait hanger that will activate the door-closure mechanism when prey has stepped thereon.

Another object of the present invention is to provide a multi-sensor animal trap wherein said sensor assembly includes a laser sensor that will detect when prey has approached the bait that will activate the door-closure mechanism when prey has approached the bait.

Yet another object of the present invention is to provide a multi-sensor animal trap having redundant power supplies including batteries and solar panels.

Still yet another object of the present invention is to provide a multi-sensor animal trap having a heating element in communication with said bait hanger for heating the bait in order increase the odiferous properties thereof for attracting prey thereto.

Another object of the present invention is to provide a multi-sensor animal trap that is simple and easy to use.

Yet another object of the present invention is to provide a multi-sensor animal trap that is inexpensive to manufacture and operate.

Additional objects of the present invention will appear as the description proceeds.

The present invention overcomes the shortcomings of the prior art by providing a versatile animal trap having a plurality of means of detecting prey there in and activating closing doors. A plurality of interlocking trap components may be interlocked together end-to-end to provide an extended containment chamber for longer prey such as snakes, alligators and the like. In such case, the sensors of the interlocking trap components between the trap member and release trap can be deactivated or transferred to the sensors of the release trap, so that the sliding doors of the interlocking trap components will not mash, chop, squeeze or injure the body of the pesky critters, and the middle interlocking trap components, sliding door will remain locked in place to allow for extra lengths of longer critters, such as snakes, alligators or the like to be contained in the extended trap components. The trap is capable of luring prey from extended distances by heating the bait to increase the range of the scent.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawings in which.

LIST OF REFERENCE NUMERALS

Figure 1:
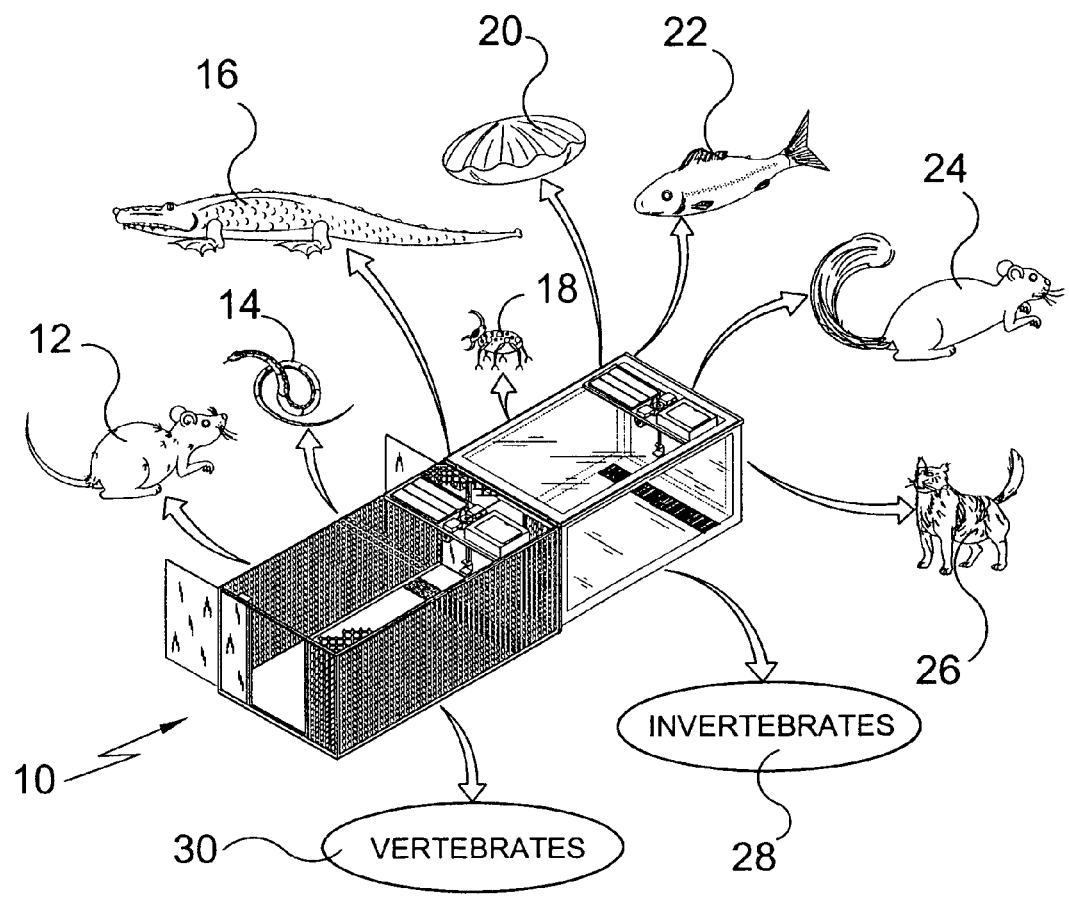
FIG. 1 is an illustrative view of the uses of the present invention.

With regard to reference numerals used, the following numbering is used throughout the drawings.

| 10 | present invention |
|----|----|
| 12 | rodent |
| 14 | snake |
| 16 | reptile |
| 18 | insect |
| 20 | mollusk |
| 22 | fish |
| 24 | squirrel |
| 26 | mammal |
| 28 | invertebrate |
| 30 | vertebrate |
| 32 | main housing |
| 34 | screen |
| 36 | front door |

| -continued | |
|----|----|
| 38 | rear door |
| 40 | power source |
| 42 | heating element |
| 44 | heated bait hanger |
| 46 | pressure sensitive pad |
| 48 | laser sensor |
| 50 | solar panel |
| 52 | door track |
| 54 | connecting slot |
| 56 | heater wire |
| 58 | release cage |
| 60 | sensor assembly |
| 62 | bait |
| 64 | animal |
| 66 | odor |
| 68 | front door/rear trap sensor |
| 70 | wiring to sensor |
| 72 | spring locking element |
| 74 | spring mechanism |

DETAILED DESCRIPTION OF THE PREFERRED EMBODIMENT

The following discussion describes in detail one embodiment of the invention. This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the uses of the present invention 10. The present invention 10 is a trap for catching animals comprising a main trap housing having slat members positioned at the rear of the housing for the adaptation of additional cages or cage, spring activated fast closing front and rear doors controlled by door sensors, laser eye to activate the system powered by battery or solar panel, heated bait hanger to attract the pest into the trap and optional suction system to further contain the animal. When the animal becomes trapped within the main trap housing, it is further enticed into entering the rear additional cage, where it again, is trapped. The rear additional cage is removed from the main trap, the main trap is reset and the animal may now be transported within the release cage to a pre-selected location. The present invention 10 may be adapted to accommodate the capture of a multitude of various types of animals including, but not limited to, rodents 12, snakes 14, reptiles 16, insects 18, mollusks 20, fish 22, squirrels 24, mammals 26, invertebrates 28, vertebrates 30 and many, many more.

Figure 2:
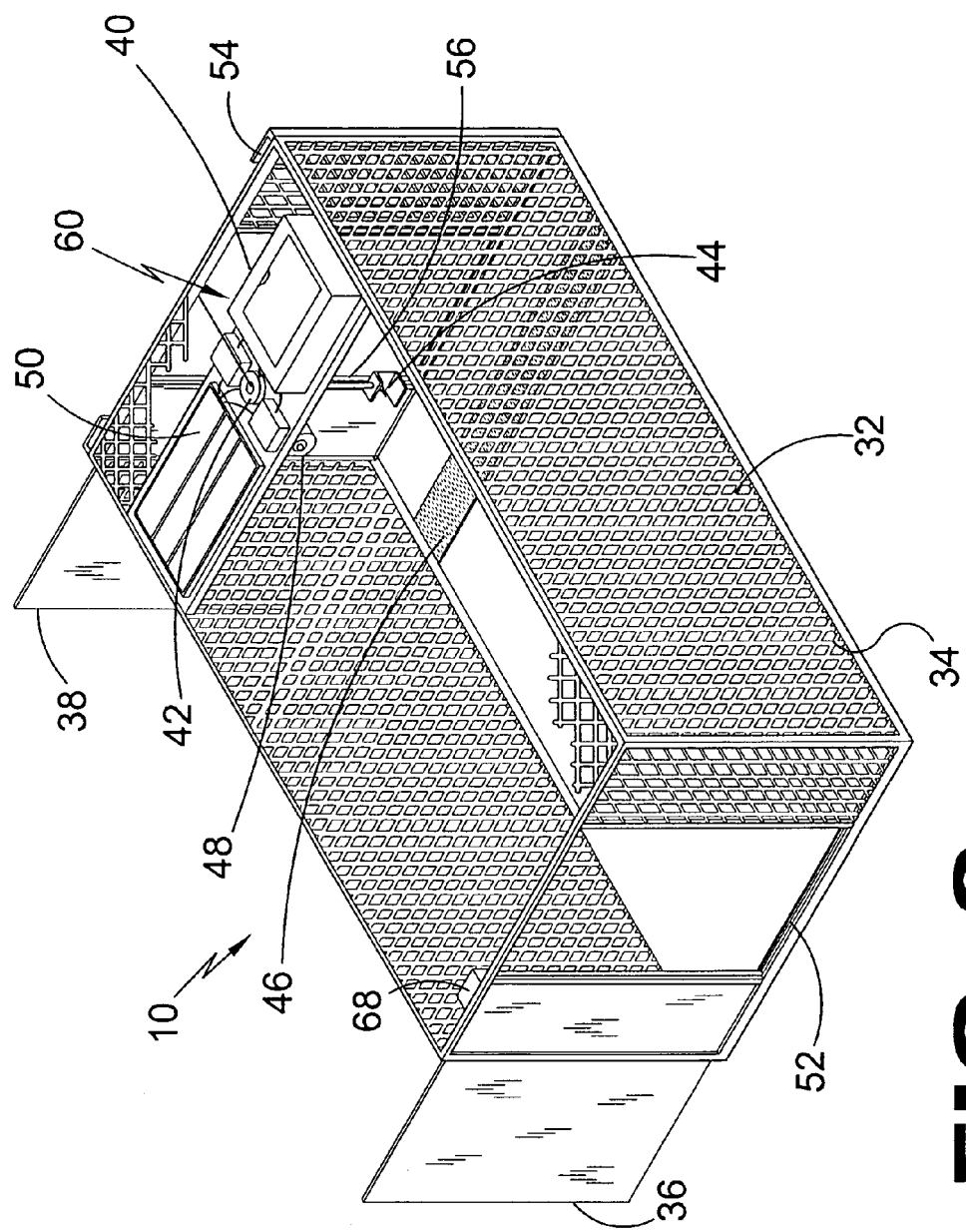
FIG. 2 is a perspective view of the present invention.

Turning to FIG. 2, shown therein is a perspective view of the trap member of the present invention 10. Shown is the main housing trap member 32 and components that comprise the trap member of the present invention 10. The present invention includes at least one primary trap 32 comprising a rigid, grated or screened 34 housing with a front 36 and rear 38 sliding door on each end, a sensor assembly 60 having at least one power source 40, e.g., battery pack, a heating element 42 communicating with a heated bait hanger 44 to heat the bait. The present invention 10 uses redundant sensors to assure capture of the animal within. A pressure-sensitive pad 46 disposed beneath the hanging bait 44 activates the door closure mechanism. A laser sensor 48 is further included to detect flying prey and others that may circumvent the ground placed pressure sensor 46. Each trap member is provided with a redundant sensor assembly to operate its doors. Also shown are a solar panel 50, front door and rear trap sensor 68 and track 52, connecting slot 54 for additional cages and heater wire 56.

Figure 3:
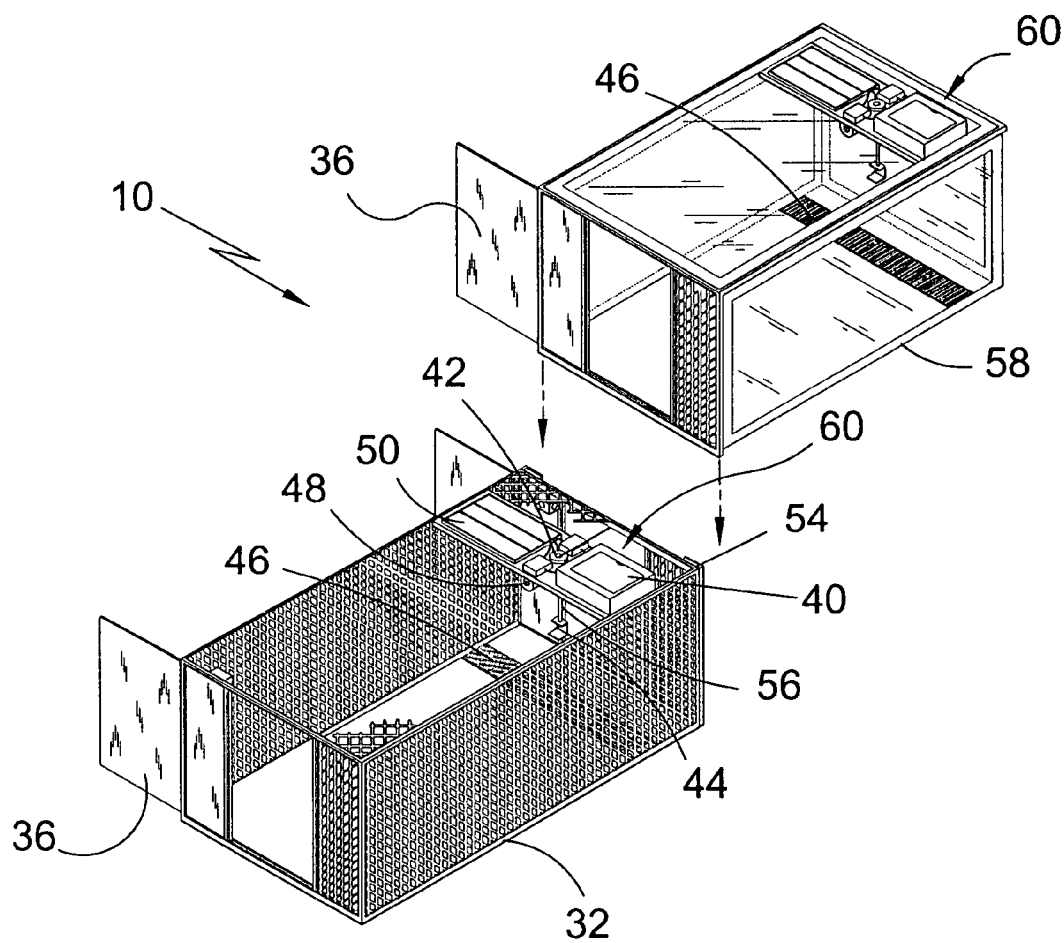
FIG. 3 is a perspective view of a trap member and release trap of the present invention.

Turning to FIG. 3, shown therein is a perspective view of a main trap member 32 and release trap 58 of the present invention 10. Shown is the present invention 10 being a trap for catching animals comprising a main trap member housing 32 having slot members 54 positioned at the rear of the housing 32 for the adaptation of additional cages 58 or cage, spring activated fast closing front doors 36 controlled by door sensors, manually operated rear doors for entrance to a second connected trap member 58 or to close as a rear wall for single traps, laser eye 48 to activate the system powered by battery 40 or solar panel 50, heated bait hanger 44 to attract the pest into the trap and optional suction system to further contain the pest. When the pest becomes trapped within the main trap member housing 32, it is further enticed into entering the second connected trap member 58 or release trap, where it again, is trapped. The release trap 58 is removed from the main trap member 32, the trap member is reset and the animal may now be transported within the release trap to a pre-selected location. For longer animals, any number of interconnected trap members may be included between the first trap member 32 and the last trap member or release trap 58. Also shown are pressure sensors 46, heating element 42, heater wire 56, and the sensor assemblies 60.

Figure 4:
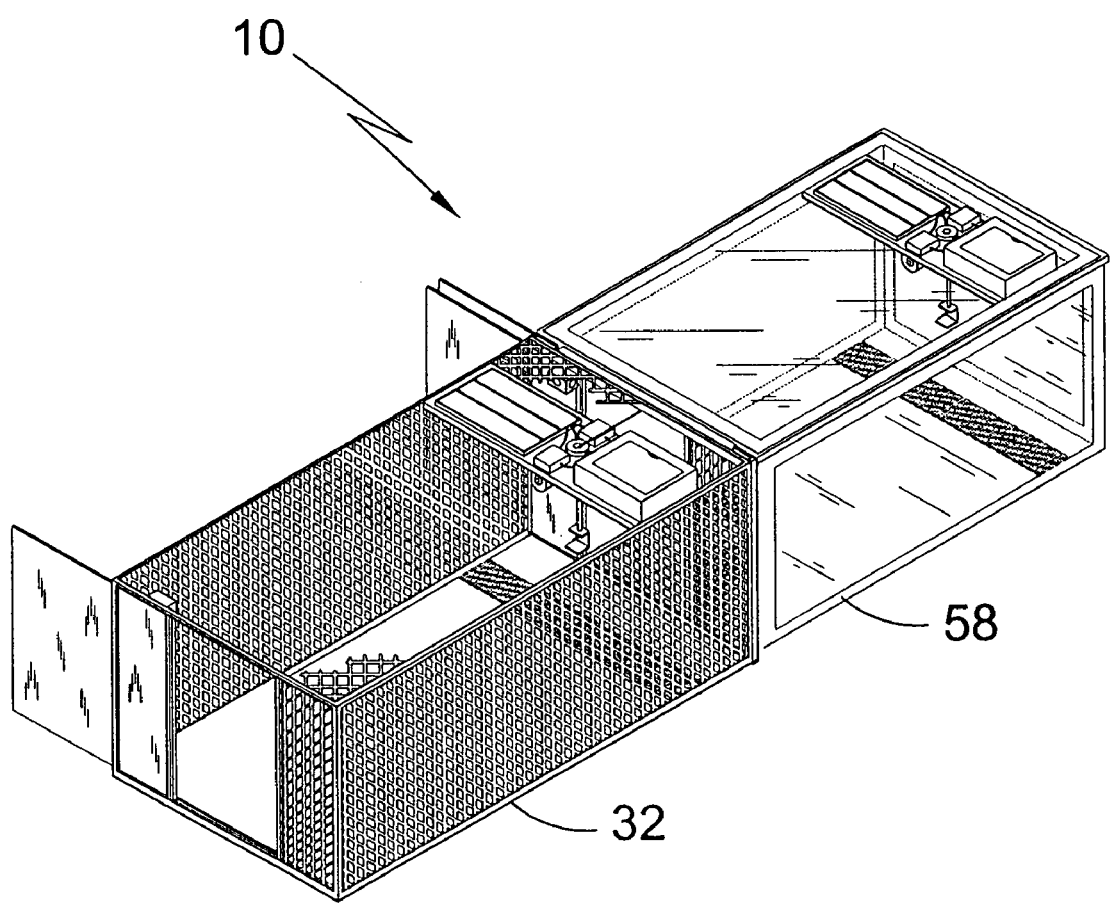
FIG. 4 is a perspective view of a trap member and release trap of the present invention interconnected.

Turning to FIG. 4, shown therein is a perspective view of a main trap member 32 and release trap 58 of the present invention 10 interconnected. Shown is the present invention 10 disclosing a trap for catching pesky critters which comprises a main trap member housing 32 having slat members positioned at the rear of the housing for the adaptation of additional cages 58 or cage, spring activated fast closing front doors controlled by door sensors, manually operated rear doors for entrance to a second connected trap member or to close as a rear wall for single traps, laser eye to activate the system powered by battery or solar panel, heated bait hanger to attract the pest into the trap and optional suction system to further contain the pest. When the pest becomes trapped within the trap member housing 32, it is further enticed into entering the second connected trap member or release trap 58, where it again, is trapped. The release trap 58 is removed from the trap member 32, the trap member is reset and the critter may now be transported within the release trap to a pre-selected location. For longer animals, any number of interconnected trap members may be included between the first trap member 32 and the last trap member or release trap 58.

Figure 5:
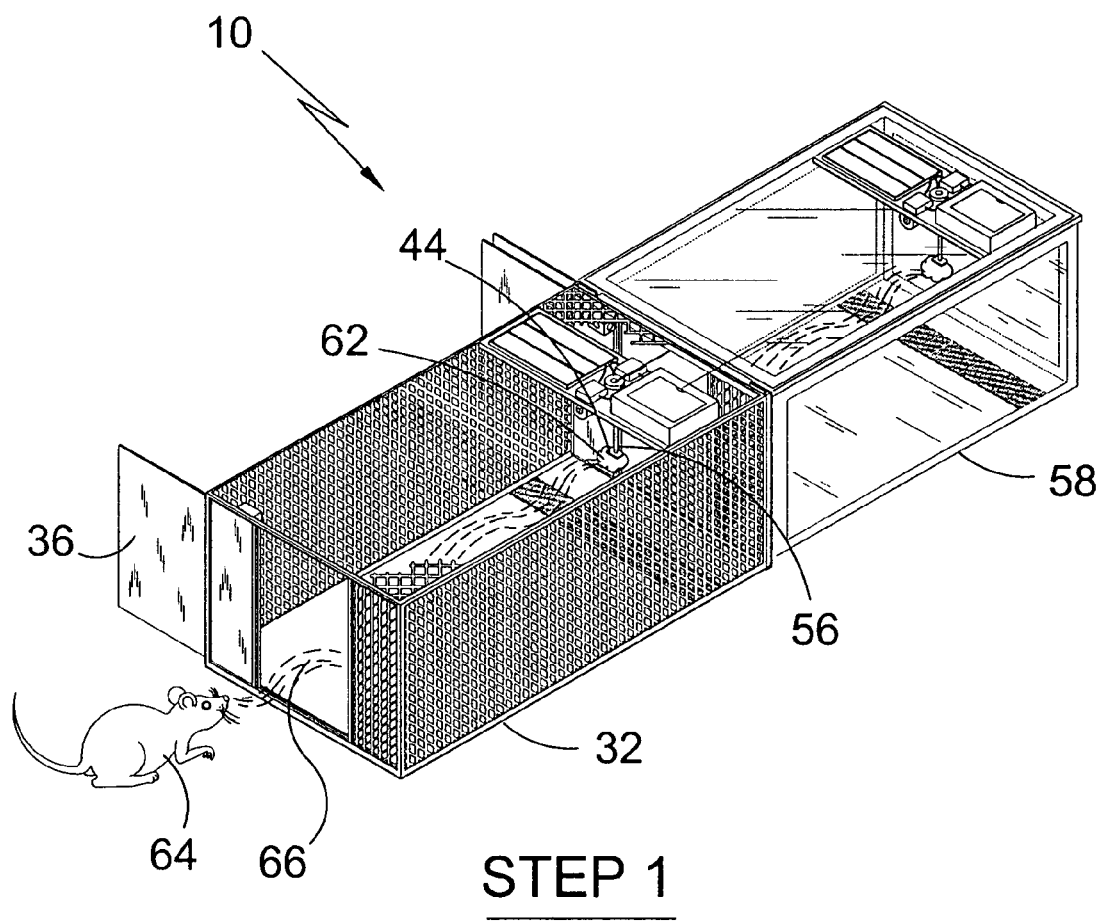
FIG. 5 is an illustrative view of step 1 in the use of the present invention.

Turning to FIG. 5, shown therein is an illustrative view of step one in the use of the present invention 10. The trap 32 is set, bait 62 is heating within the bait hanger 44, releasing food odor shown at 66 into the air. The animal 64 smells the bait 62 and cannot resist and the animal 64 enters the trap housing 32. Other previously disclosed elements are also shown.

Figure 6:
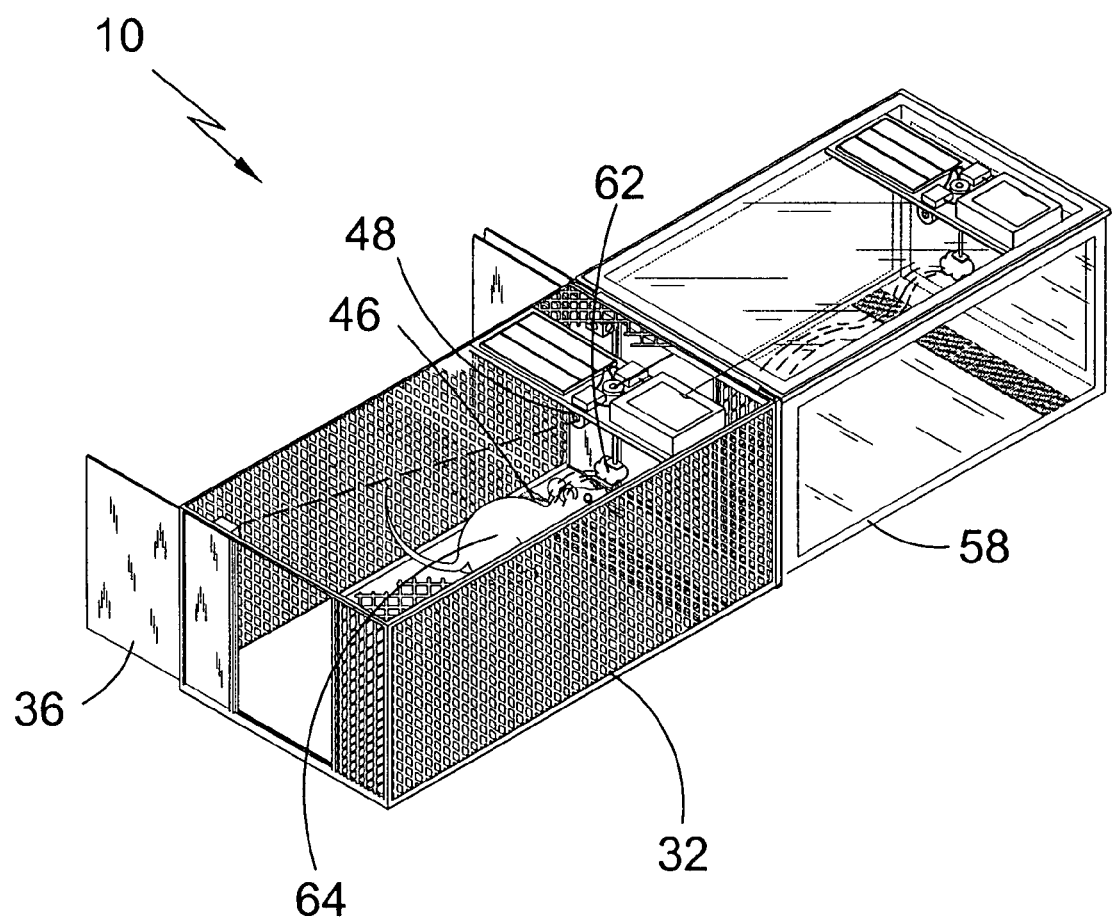
FIG. 6 is an illustrative view of step 2 in the use of the present invention.

Turning to FIG. 6, shown therein is an illustrative view of step two in the use of the present invention 10. The animal 64 enters the trap member 32 enticed by the odor of the heated bait 62, crosses the critter sensor device 46 and triggers the front door sensor directly closing the front door 36. The laser eye 48 is an attachment which activates the front fast-closing door directly when the critter 64 comes in view of the bait in the event that the critter hops or flies over the floor-based pressure sensor 46. The redundant sensor systems provide a more efficient trap than those demonstrated in the prior art. Release trap 58 is also shown.

Figure 7:
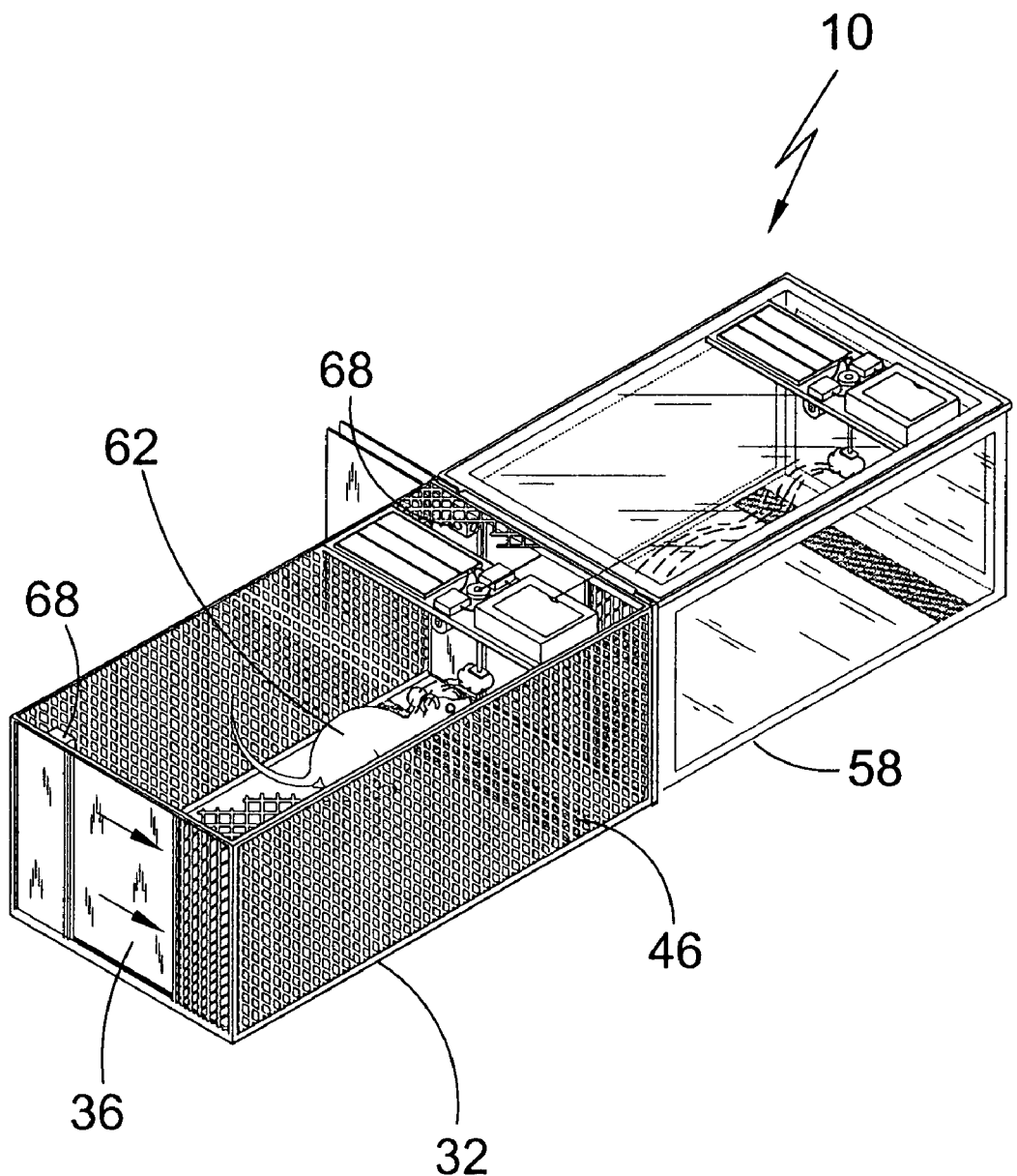
FIG. 7 is an illustrative view of step 3 in the use of the present invention.

Turning to FIG. 7, shown therein is an illustrative view of step three in the use of the present invention 10. The animal 62 enters the trap member 32 enticed by the odor of the heated bait, crosses the critter sensor device 46 and triggers the front door sensor directly closing the front door 36. The laser eye is an attachment which activates the front fast-closing door 36 directly when the animal 62 comes in view of the bait in the event that the critter hops or flies over the floor-based pressure sensor 46. The redundant sensor systems provide a more efficient trap than those demonstrated in the prior art. Also shown are the rear trap sensors 68 and release trap 58.

Figure 8:
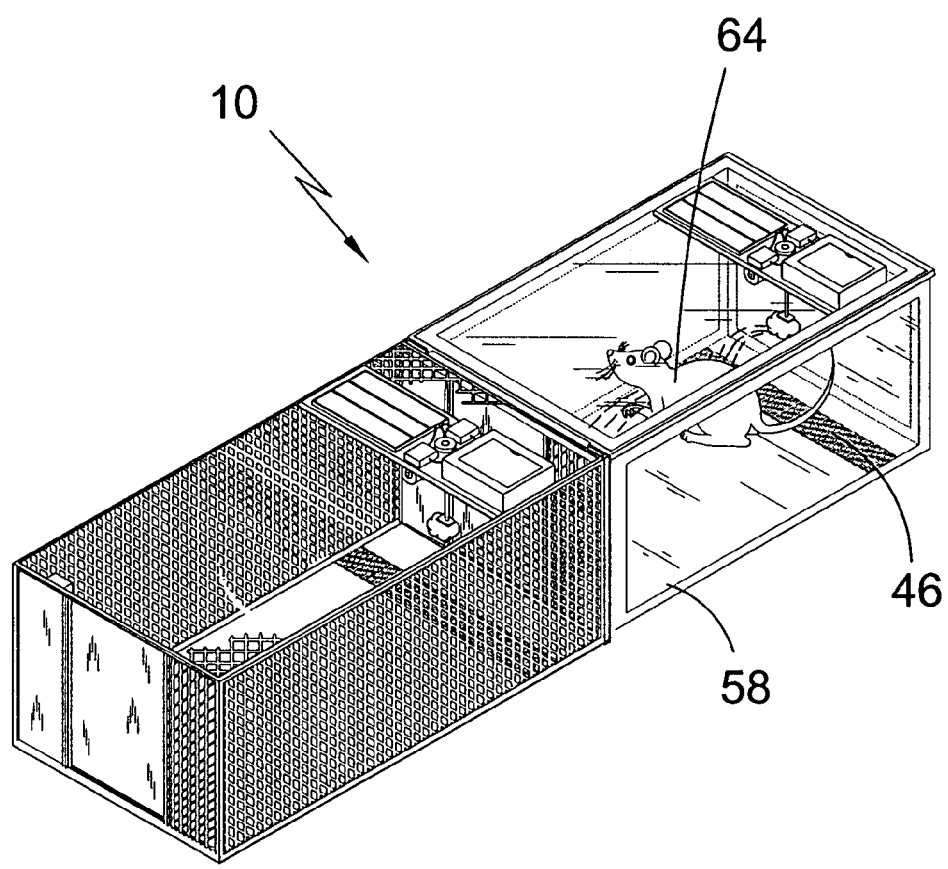
FIG. 8 is an illustrative view of step 4 in the use of the present invention.

Turning to FIG. 8, shown therein is an illustrative view of step four in the use of the present invention 10. The animal 64 enters the release trap 58 where cage door is activated to close, trapping the critter within. The release trap 58 may now be removed from the main trap member 32. The release trap 58 can be transported to a place of release. Also shown is pressure pad 46.

Figure 9:
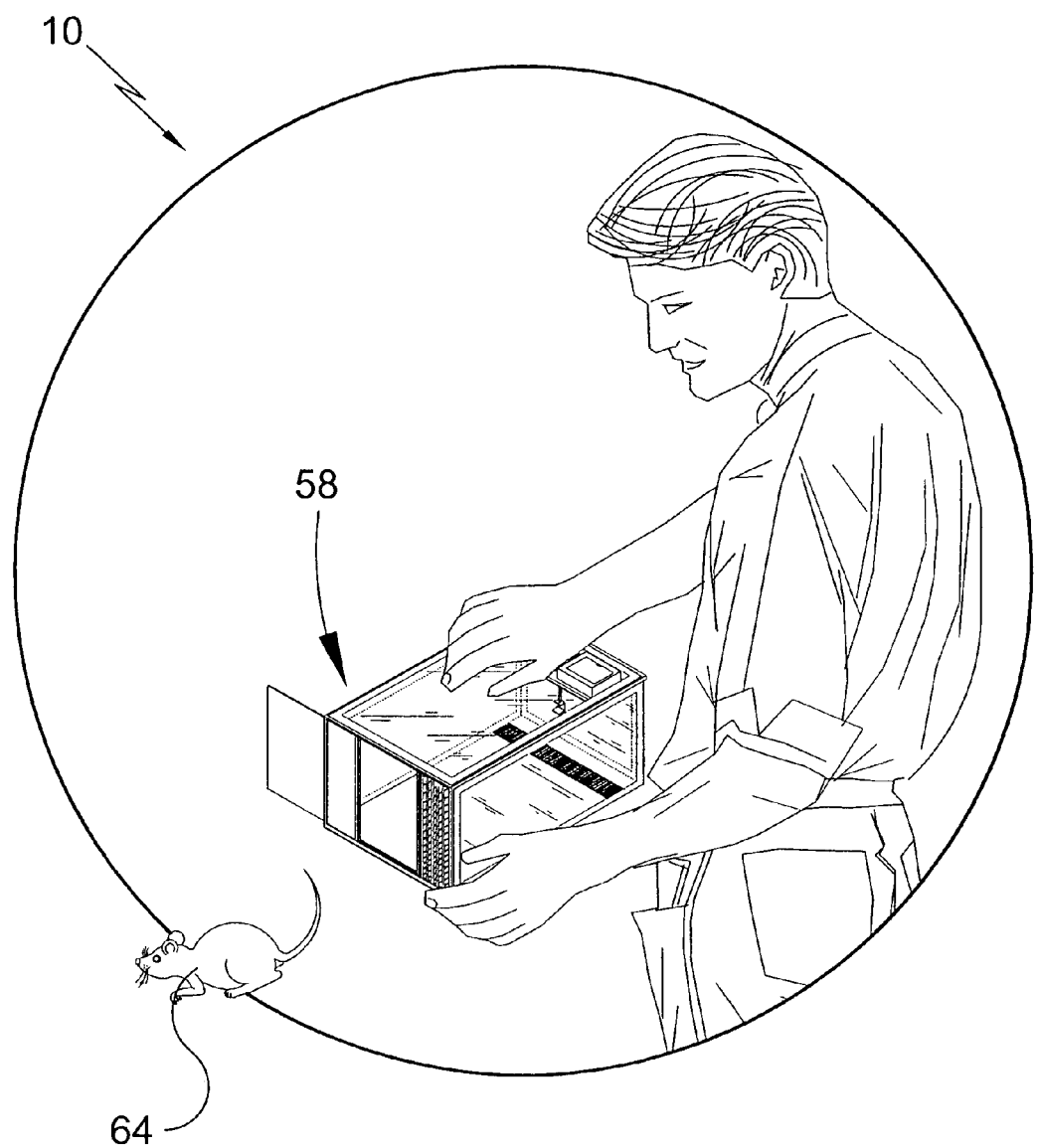
FIG. 9 is an illustrative view of step 5 in the use of the present invention.

Turning to FIG. 9, shown therein is an illustrative view of step five in the use of the present invention 10. The additional cage 58 may now be removed from the main trap and the main trap can be reset. The additional cage 58 can be transported to a place to release the animal 64.

Figure 10:
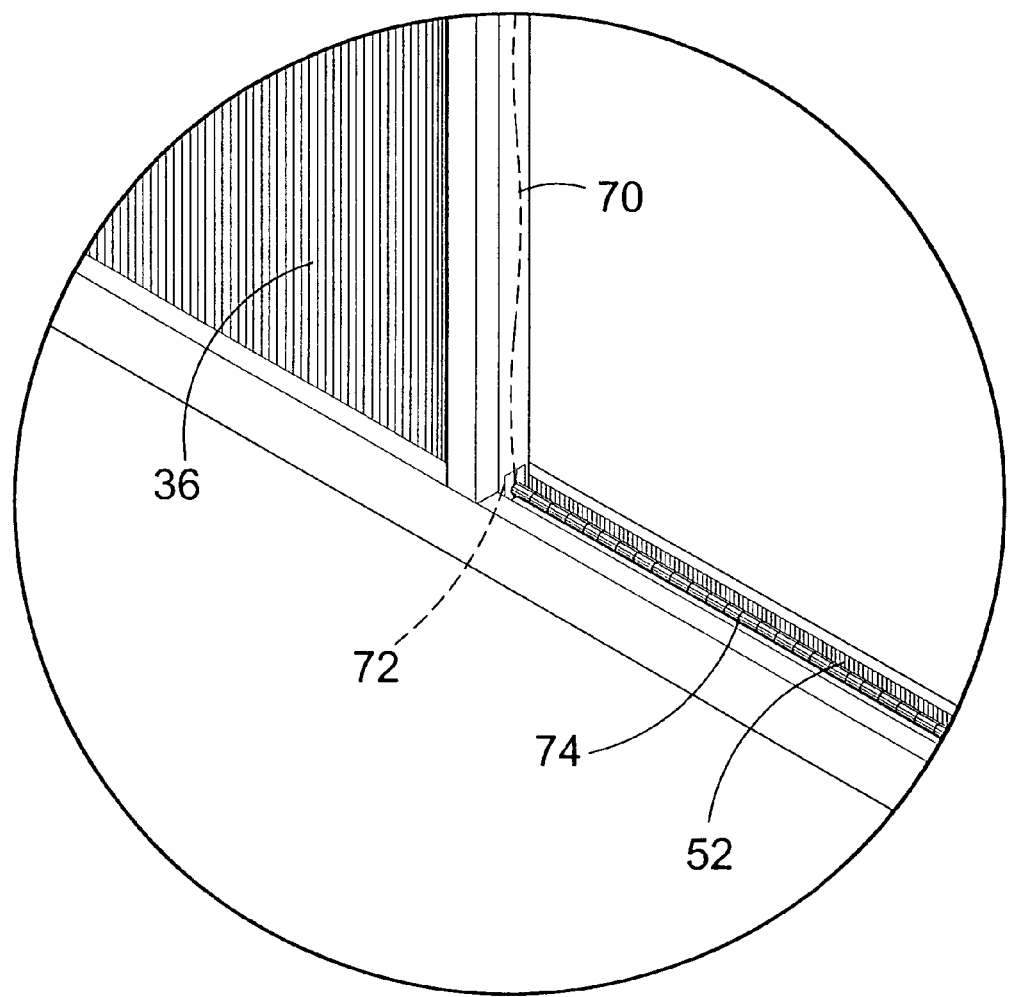
FIG. 10 is a detailed view of the door portion of the present invention.

Turning to FIG. 10, shown therein is a detailed view of the door portion of the present invention. Shown is the present invention being a trap for catching animals comprising a spring activated fast closing front doors 36 controlled by door sensors. The system is battery or solar powered. Other suitable door closure means may be employed including, but not limited to, electric motors and the like. Also shown are track 52, wiring to sensor 70, spring lock element 72 and spring mechanism 74.

Figure 11:
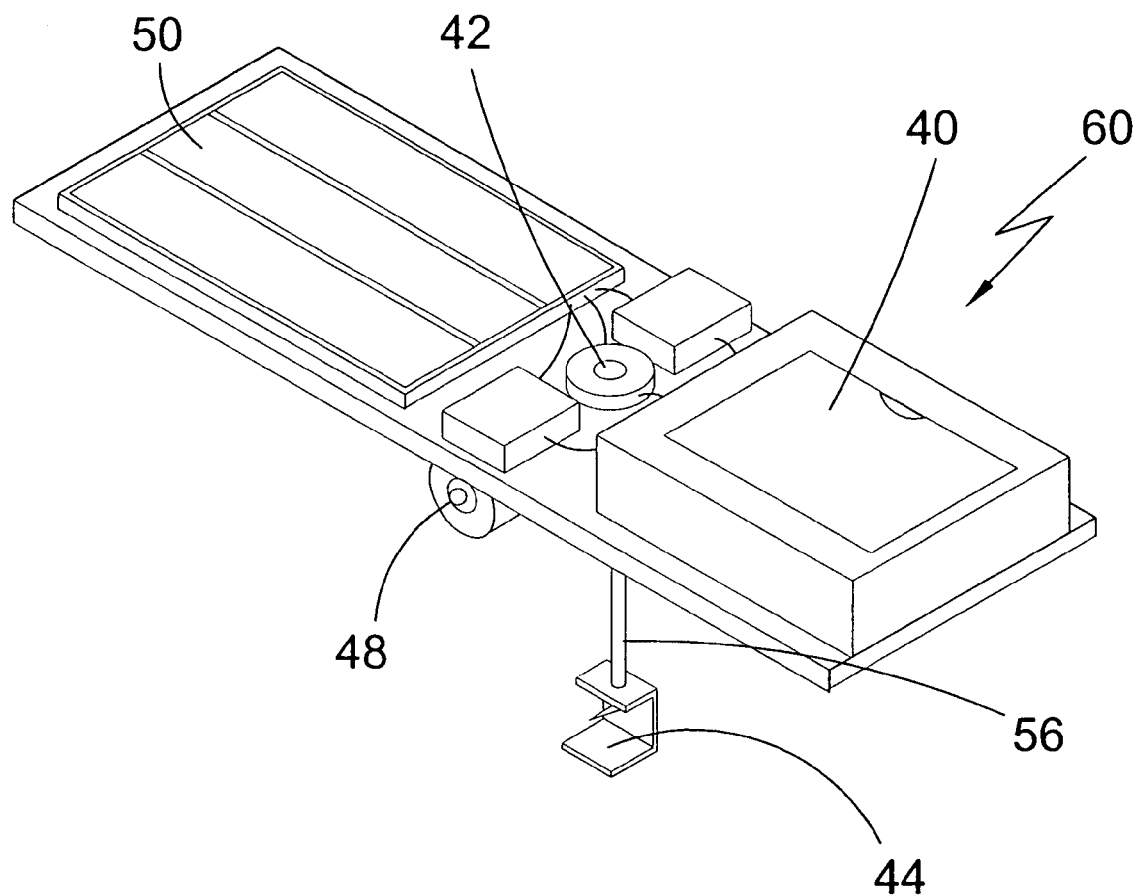
FIG. 11 is a detail view of the sensor assembly of the present invention.

Turning to FIG. 11, shown therein is a detail view of the sensor assembly 60 of the present invention. Shown is a detail view of sensor assembly 60 of the present invention disclosing a trap for catching pesky critters comprises a main trap housing having slat members positioned at the rear of the housing for the adaptation of additional cages or cage, spring activated fast closing front door controlled by door sensors, laser eye sensor 48 to detect prey that could circumvent the pressure sensitive sensors powered by battery 40 or solar panel 50, heated bait hanger 44 to attract the pest into the trap and optional suction system to further contain the pest. When the pest becomes trapped within the main trap housing, it is further enticed into entering the rear additional cage, where it again, is trapped. The rear additional cage is removed from the main trap, the main trap is reset and the critter may now be transported within the release cage to a pre-selected location. Also shown are the heating element 42 and heater wire 56.

I claim:

1. An apparatus for an animal trap, comprising:
   a) a first trap having front and rear ends, a top and bottom, and a pair of sides;
   b) a door being disposed on each of said front and rear ends to permit an animal to enter and exit the first trap; said rear door is manually operable; a first pressure sensitive pad;
   c) a first sensor assembly connected to activate said door and being disposed on said first trap for detecting the presence of an animal in said first trap and closing said front door disposed on said front end of said first trap, said first sensor assembly including:
      i) a laser eye for detecting the presence of an animal in said first trap;

ii) a bait hanger being disposed over said first pressure sensitive pad to provide a place where bait can be placed;
iii) a heating element coupled to provide heat to said bait hanger; and,
iv) a source of power for applying a potential to said heating element causing said heating element to heat up and thereby heat said bait hanger and bait placed on said bait hanger; and,
d) said first pressure sensitive pad connected to activate said front door and being disposed on said bottom of said first trap for detecting the presence of an animal in said first trap and closing said front door of said first trap, wherein said first sensor assembly is able to detect the presence of an animal within said first trap and undetected by said first pressure sensitive pad.

2. The apparatus of claim 1, further comprising:
a) a second trap having front and rear ends, a top and bottom, and a pair of sides, wherein said front end of said second trap and said rear end of said first trap are adapted for connection to each other;
b) a door being disposed on said front end of said second trap to permit an animal to enter and exit the second trap;
c) a second sensor assembly connected to activate said front door of said second trap and being disposed on said second trap for detecting the pressure of an animal in said second trap and closing said front door of said second trap; and,
d) a second pressure sensitive pad connected to activate said front door of said second trap and being disposed on said bottom of said second trap for detecting the presence of an animal in said second trap and closing said front door of said second trap, wherein said second sensor assembly is able to detect the presence of an animal within said second trap and undetected by said second pressure sensitive pad.

3. The apparatus of claim 2, wherein said first trap comprises a screened structure.

4. The apparatus of claim 3, wherein said second trap comprises a transparent structure.

5. The apparatus of claim 4, wherein said second trap comprises a tempered glass structure.

6. The apparatus of claim 5, wherein said front and rear door of said first trap and said front door of said second trap are each sliding doors.

7. The apparatus of claim 6, further comprising a track being disposed on said bottom of said trap in correspondence to each of said sliding doors to permit each of the doors to slide in the track.

8. The apparatus of claim 1, wherein said source of power is a battery.

9. The apparatus of claim 8, wherein said source of power is a solar cell.

10. The apparatus of claim 9, wherein said second sensor assembly comprises:
a) a laser eye for detecting the presence of an animal in said second trap;
b) a bait hanger being disposed over said second pressure sensitive pad to provide a place where bait can be placed;
c) a heating element coupled to said bait hanger for heating bait placed on said bait hanger; and,
d) a source of power for applying a potential to said heating element of said second trap.

11. The apparatus of claim 10, wherein said source of power is a battery.

12. The apparatus of claim 11 wherein said source of power is a solar cell.

13. The apparatus of claim 12, wherein each of said doors are manually opened.

14. The apparatus of claim 13, wherein each of said doors are automatically closed.

15. The apparatus of claim 14, wherein each of said doors are electrically closed.

* * * * *